United States Patent [19]

Lurois

[11] Patent Number: 5,297,604
[45] Date of Patent: Mar. 29, 1994

[54] TREAD FOR RADIAL CARCASS TIRES FOR HEAVY VEHICLES

[75] Inventor: Patrick Lurois, Greenville, S.C.

[73] Assignee: Compagnie Generale Des Etablissements Michelin - Michelin & Cie, Clermont-Ferrand, France

[21] Appl. No.: 788,090

[22] Filed: Nov. 5, 1991

[30] Foreign Application Priority Data

Nov. 15, 1990 [FR] France .................. 90/14344

[51] Int. Cl.$^5$ .............................................. B60C 11/11
[52] U.S. Cl. ............................................ 152/209 R
[58] Field of Search ............. 152/109 R, 209 D, 209 R

[56] References Cited

U.S. PATENT DOCUMENTS

| 2,891,594 | 6/1959 | Ford ................................ 152/209 B |
| 3,844,326 | 10/1974 | Verdier ............................ 152/209 B |
| 4,177,850 | 12/1979 | Ogawa et al. ................... 152/209 R |
| 4,186,788 | 2/1980 | Pommier . |
| 4,284,115 | 8/1981 | Ohnishi . |
| 4,461,334 | 7/1984 | Tansei et al. ................... 152/209 R |
| 4,832,099 | 5/1989 | Matsumoto . |

FOREIGN PATENT DOCUMENTS

| 1480919 | 2/1969 | Fed. Rep. of Germany ... 152/209 R |
| 2238602 | 3/1975 | Fed. Rep. of Germany ... 152/209 R |
| 3445041 | 6/1986 | Fed. Rep. of Germany ... 152/209 R |
| 0080102 | 4/1987 | Japan .............................. 152/209 B |
| 0232007 | 9/1988 | Japan .............................. 152/209 R |
| 0258203 | 10/1988 | Japan .............................. 152/209 D |
| 1360203 | 7/1974 | United Kingdom . |

OTHER PUBLICATIONS

Patent Abstracts of Japan, vol. 12, No. 113 (M-683) [2960] Apr. 9, 1988.

*Primary Examiner*—Michael W. Ball
*Assistant Examiner*—Nancy T. Krawczyk
*Attorney, Agent, or Firm*—Brumbaugh, Graves, Donohue & Raymond

[57] ABSTRACT

Tread for heavy-vehicle tires with radial carcass having at least one circumferential groove (1) in the form of a broken line and wide transverse grooves (2) in the form of a broken line defining blocks, the wide transverse grooves (2) having walls of constant and symmetrical inclination over a median zone (6) extending on both sides of the median plane over a width of between 40% and 75% of the width of the tread and having, beyond said median zone and up to the edges, walls of variable and asymmetrical inclination as well as two circumferential narrow side grooves (5) located at a distance from the edges not exceeding ⅓ of the width of the tread and having a depth of between 10% and 70% of the depth of the transverse grooves.

13 Claims, 1 Drawing Sheet

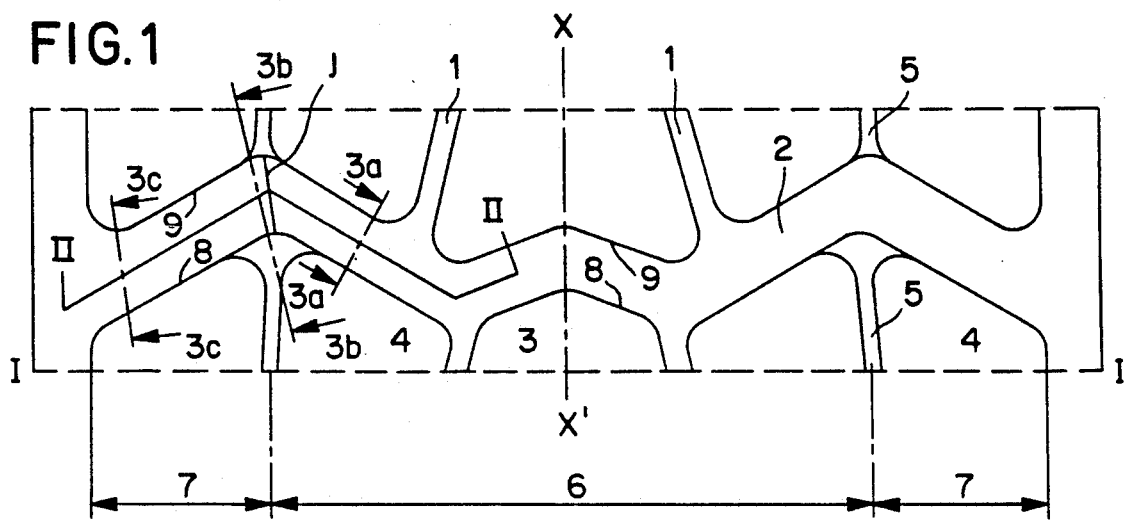
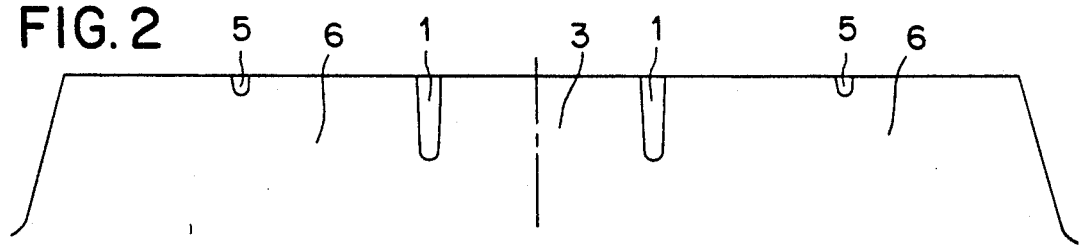
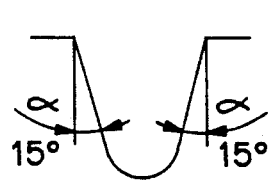 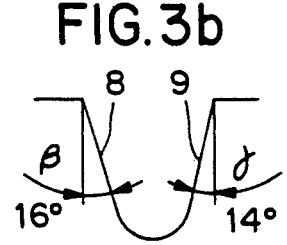 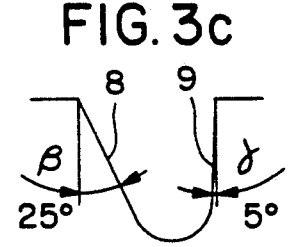
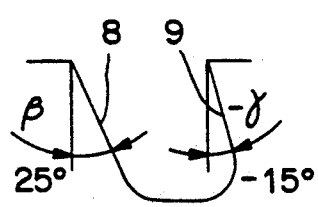

TREAD FOR RADIAL CARCASS TIRES FOR HEAVY VEHICLES

BACKGROUND OF THE INVENTION

The present invention relates to a tread for heavy-duty radial carcass tires, in particular for heavy vehicles intended to travel both on the highway and on different terrains.

Experience shows that the treads of radial tires for heavy vehicles intended for mixed road/construction-site travel are subject, due to the severe constraints to which they are subjected, on the one hand to extensive wear of the side zones which takes the form of a breakdown of the edges of the tread and, on the other hand, an abnormal saw-tooth wear. These two types of wear are particularly substantial on the treads of tires mounted on the drive axles of the vehicle, whether in individual or in twin mounting.

These two types of wears are greater when the tread essentially comprises individual blocks which produce better adherence to movable soil to the detriment of accelerated wear on the highway.

In order to reduce abnormal wear of a tread formed of individual blocks separated by grooves from each other, it has been proposed in British Patent Application 2 008 043 to arrange bridges of rubber in the side transverse grooves provided with a fine incision, and this on both sides of a narrow circumferential groove of the same depth as the two wide circumferential grooves separating two adjacent blocks in the transverse direction.

Such a solution, to be sure, results in a gain in wear due to the bridge effect which takes place between the blocks in the area of contact with the ground but to the detriment of the adherence on diversified terrain, and this without preventing a rather rapid breakdown of the edges of the tread.

SUMMARY OF THE INVENTION

The present invention is directed at producing a tread for radial tires intended for mixed road/construction-site travel which considerably delays the appearance both of the breakdown of the side zones of the tread and of the abnormal saw-tooth wear, while reducing the general level of wear of the tread. The present invention also relates to a radial heavy-vehicle tire having a tread in accordance with the invention.

The tread in accordance with the invention, which has at least one broken-line groove of generally circumferential orientation and grooves of generally transverse orientation defining at least two rows of individual blocks, is characterized by the fact that the wide grooves of generally transverse orientation have walls of an inclination which is constant and symmetrical with respect to the normal to the tread over a median zone extending on both sides of the median plane of the tread over a width of between 40% and 75% of the width of the tread and possess, beyond the said median zone and up to the edges of the tread, walls having a variable and asymmetrical inclination, and by the fact that two narrow side grooves of generally circumferential orientation are located in the side zones of the tread at a distance from the edges not exceeding ⅛ of the width of the tread and having a depth less than that of the broken-line grooves of generally transverse orientation of between 10% and 70% of the depth of said grooves.

The width of the tread is the distance between the edges of the side blocks when they have a sharp edge or the distance measured between the points of intersection of the tangents to the surface of the tread in contact with the ground, on the one hand, and to the side edges of the tread on the other hand. The width of the grooves is measured perpendicular to at least one of the walls at the surface of the tread in contact with the ground.

The central groove or grooves of generally circumferential orientation may or may not have the same depth as the grooves of generally transverse orientation. The two narrow lateral circumferential grooves arranged in the side blocks of rubber arranged close to the edges of the tread have a width of between 1% and 3% of the width of the tread.

The width of the grooves of generally transverse orientation is between 1% and 3% of the outside diameter of the new tire mounted on a suitable wheel, inflated, and loaded under rated conditions. The angle of inclination of the walls of the transverse grooves having a symmetrical inclination with respect to the normal to the surface of the tread is that customarily used for this type of tire, that is to say, generally between 10° and 20°, and preferably 15°.

For the side parts of the wide grooves of transverse orientation what is essential is the asymmetry of the inclination of the two walls constituting the wide grooves of transverse orientation with respect to the direction of variation of the variable inclination of each of the walls. The value of the angles of inclination of the leading edges and of the trailing edges is not critical, provided that there is asymmetry of the values between the two walls; in particular, the angles of inclination may have a positive or negative inclination, that is to say, the walls may be undercut. The blocks defined by the grooves may be of any geometrical shape. In accordance with preferred arrangements:

- the tire has two circumferential grooves;
- the wide transverse grooves are in a broken line;
- the inclination of one of the walls of the transverse grooves varies continuously from 15° at the junction with the median portion having a constant, symmetrical inclination up to 25° on the edge of the tread, while the inclination of the side wall which is directly opposite and facing the preceding one, varies from 15° at the junction with the median portion of constant and symmetrical inclination, up to 5% on the edge of the tread;
- the difference in inclination between the two ends of the walls of the transverse grooves amounts to, at most, 20°;
- all the blocks of the tread which are defined by the grooves have a salient angle constituting the wall of the leading edge of the blocks defining the transverse grooves;
- all the blocks of the tread have a re-entrant angle constituting the wall of the trailing edge of the blocks defining the transverse grooves;
- the wall having the smallest relative variable inclination constitutes the trailing edge of the side blocks and that having the largest relative inclination constitutes the leading edge of the said side blocks;
- the value of the angle of inclination of the edges of the walls of a constant, symmetrical inclination is less than or at most equal to that of the angle of inclination of the leading edges of the portion of the transverse grooves having walls of asymmetrical inclination and is equal to or greater than that of the angle of inclination of the trailing edges of the portion of the transverse groove having walls of asymmetrical inclination;

the narrow side circumferential groove is arranged in the middle of the side blocks adjacent to the edges of the tread;

the narrow side circumferential groove connects the vertex of the salient angle constituting one of the walls of the blocks to the vertex of the re-entrance angle constituting the opposite wall of the blocks;

the narrow side circumferential groove is located at the place of the line connecting the ends of the walls of symmetrical inclination with respect to the normal to the tread and the walls having an asymmetrical inclination;

the narrow side circumferential groove has a depth of between 15% and 25% of the depth of the wide transverse grooves.

DESCRIPTION OF DRAWINGS

The invention is illustrated in non-limitative manner by the figures of the embodiment described.

FIG. 1 is a plan view of a sector of a tread in accordance with the invention;

FIG. 2 is a section along the line I—I of a tread according to the invention;

FIGS. 3a, 3b and 3c represent, respectively, cross-sections along the lines 3a—3a, 3b—3b and 3c—3c of a transverse groove in the vicinity of the line II—II of FIG. 1;

FIG. 4 represents in cross section another embodiment of the side walls of the transverse grooves having an asymmetrical inclination with one of the walls undercut.

DESCRIPTION OF PREFERRED EMBODIMENTS

FIG. 1 shows a tread of a heavy-vehicle tire of size 11 R 22.5 formed of a radial carcass, the ends of which are wound around a bead wire arranged in the beads of the tire, and of a crown reinforcement consisting of a plurality of plies of metal cables crossed symmetrically with respect to each other.

The tread comprises two narrow broken-line circumferential central grooves 1 having a width of 2.8% located on opposite sides of and near the median plane at a distance representing 25% of the width of the tread, and a plurality of wide broken-line transverse grooves 2 having a width of 1.5% of the outside diameter of the tire, defining central blocks 3 and side blocks 4 having the shape of arrowheads. The depth of the central circumferential grooves 1 and of the transverse grooves 2 is the same. A narrow circumferential groove 5 having a depth of 1.7% of the depth of the transverse grooves 2, as shown in FIG. 2, is arranged in the middle of the side blocks 4 at a distance from the edges of the tread which represents 19% of the width of the tread and it connects the two opposite faces of the side block in circumferential direction.

The broken-line wide transverse grooves 2 have, on the median part 6 arranged on both sides of the axis X—X of the tread and defined by the narrow circumferential grooves 2, walls the inclination of which is symmetrical with respect to the normal to the surface of the tread, as can be noted from FIG. 3a at the level of the section 3a—3a and this over a distance of 64% of the width of the tread. The angle of inclination α is that conventionally used on heavy-vehicle tires, that is to say, 15°. The transverse grooves 2 have, in the side zones 7 arranged on opposite sides of the median zone 6, asymmetrical opposite walls whose inclination varies from the junction line J defining the ends having a symmetrical and constant inclination of the walls towards the edges of the tread. The edges 8 of the blocks 6 formed by the salient angle form the leading edges of the blocks 4 while the opposite edges 9 formed by the re-entrant angle form the trailing edges of the blocks. As can be noted from FIGS. 3b and 3c, the angle of inclination β with respect to the normal to the surface of the tread of the leading edges 8 of the walls of the grooves 2 varies continuously from an angle having a value of 15° at the place of the junction line J to an angle having a value of 25° at the edges of the tread. The inclination γ of the trailing edges 9 of the walls of the grooves 2 varies continuously from an angle of a value of 15° at the junction line J to an angle of a value of 5° at the edges of the tread.

FIG. 4 shows a variant embodiment of the side walls of the transverse grooves having a leading wall 8 with a positive angle of inclination and an undercut trailing wall 9, that is to say, a wall having a negative angle of inclination of a value of −15%.

A comparative test was carried out with inflated tires loaded under rated conditions. A tire of size 11 R 22.5 having a tread in accordance with the invention was compared with a control tire having the same construction except for the tread. The tires were mounted in twin mountings on the inner side on the drive axle of a heavy vehicle and subjected to mixed travel on a tar road for 90% of the mileage travelled and on various non-tarred terrains for 10% of the mileage traversed over a distance of 60,000 kilometers. At the end of this travel, the differences in height of rubber of the two treads were measured on the edges, at the center, and midway between the edges and the center of the tread.

As compared with the heights of the new tire treads, the tread of the control tire shows a difference in height of 6 mm between the edge and the point considered at mid-distance, and a difference in height of 3 mm between the point considered at mid-distance and the center, while in the case of the tread of the tire in accordance with the invention, the differences in height are 2 mm and 1 mm respectively. Furthermore, the tread of the control tire shows a substantial breakdown of the edges with saw-tooth wear and hollow wear particularly in the median zone, while the tread in accordance with the invention shows less wear, on the order of ⅓, uniformly distributed over its entire width.

The test results clearly show that the tread of the invention makes it possible very substantially to delay the appearance of breakdown of the edges of the tread and the appearance of irregular saw tooth wear and to increase the life of the tire.

I claim:

1. A tire tread for a heavy-duty tire, wherein when the tread is formed in a circumferential configuration, said tread comprising at least one broken-line groove of generally circumferential orientation (1) and wide grooves of generally transverse orientation (2) defining at least two rows of individual blocks, characterized by the fact that the wide grooves of generally transverse orientation (2) have opposing walls of a constant and symmetrical inclination with respect to normals to the tread over a median zone (6) extending on both sides of the median plane of the tread over a center tread width of between 40% and 75% of the width of the tread and, have beyond the said median zone and up to the edges of the tread, opposing walls of an asymmetrical variable inclination from one wall relative the other, the inclination angles of the opposing groove walls having an asymmetrical variable inclination with respect to normals to the tread gradually changing from beyond the median zone to the tread edge, and by the fact that two narrow side grooves of generally circumferential orientation (5) are located in the side zones (7) of the tread at a distance from the edges not exceeding ⅓ of the width of the tread and having a depth less than that of the grooves of generally transverse orientation of between 10% and 70% of the depth of said transverse grooves.

2. A tread according to claim 1, characterized by the fact that the angle of inclination of the transverse grooves (2) beyond the median zone (6) varies in absolute value in opposite direction between the leading edges and the trailing edges.

3. A tread according to claim 1, characterized by the fact that the angle of inclination of the walls of the transverse grooves (2) beyond the median zone (6) increases in absolute value on one of the edges of the walls of said grooves and decreases in absolute value on the opposite edge of the walls of said groove in the direction of the edges of the tread.

4. A tread according to claim 1, characterized by the fact that the leading edges (8) of the walls of the transverse grooves (2) beyond the median zone (6) have a minimum angle of inclination equal to or greater than the maximum angle of inclination of the trailing edges (9) of said grooves.

5. A tread according to claim 4, characterized by the fact that one of the edges of the walls of the transverse grooves (2) beyond the median zone (6) has an angle of inclination having an increasing positive absolute value and the opposite edge has a decreasing angle of inclination varying from a positive value of angle to a negative value of angle.

6. A tread according to claim 1, characterized by the fact that the depth of the narrow side grooves (5) is between 15 and 25% of the depth of the transverse grooves (2).

7. A tread according to claim 1, characterized by the fact that the narrow side grooves (5) located in the side zones (7) are arranged in the middle of the side blocks and debouch in the transverse grooves (2).

8. A tread according to claim 1, characterized by the fact that it comprises two broken-line grooves of generally circumferential orientation (1).

9. A radial carcass heavy-vehicle tire, the tread of which has at least one broken-line groove of generally circumferential orientation (1) and wide grooves of generally transverse orientation (2) defining at least two rows of individual blocks, characterized by the fact that the wide grooves of generally transverse orientation (2) have opposing walls of a constant, symmetrical inclination with respect to the normals to the tread over a median zone (6) extending on both sides of the median plane of the tread over a center tread width of between 40% and 75% of the width of the tread and have, beyond the said median zone and up to the edges of the tread, opposing walls of a variable, asymmetrical inclination from one wall relative to the other, the inclination angles of the opposing groove walls having a variable, asymmetrical inclination with respect to normals to the tread gradually changing from beyond the median zone to the tread edge, and by the fact that two narrow side grooves of generally circumferential orientation (5) are located in the side zones (7) of the tread at a distance from the edges not exceeding ⅓ of the width of the tread and having a depth less than that of the grooves of generally transverse orientation of between 10% and 70% of the depth of said transverse grooves.

10. A tire according to claim 9, characterized by the fact that the angle of inclination of the transverse grooves (2) beyond the median zone (6) varies in absolute value in opposite direction between the leading edges (8) and the trailing edges (9).

11. A tire according to claim 9, characterized by the fact that the angle of inclination of the walls of the transverse grooves (2) beyond the median zone (6) increases in absolute value on one of the edges of the walls of said grooves and decreases in absolute value on the opposite edge of the walls of said grooves in the direction of the edges of the tread.

12. A tire according to claim 9, characterized by the fact that the leading edges (8) of the walls of the transverse grooves (2) beyond the median zone (6) have a minimum angle of inclination equal to or greater than the maximum angle of inclination of the trailing edges of said grooves.

13. A tire according to claim 9, characterized by the fact that the leading edges (8) of the walls of the transverse grooves (2) have a minimum angle of inclination equal to or greater than the maximum angle of inclination of the trailing edges (9) of said walls.

* * * * *

UNITED STATES PATENT AND TRADEMARK OFFICE
CERTIFICATE OF CORRECTION

PATENT NO. : 5,297,604

DATED : March 29, 1994

INVENTOR(S) : Patrick Lurois

It is certified that error appears in the above-identified patent and that said Letters Patent is hereby corrected as shown below:

Col. 5, bridging lines 3 and 4, "and, have" should read --and have,--;

Col. 5, line 28, "groove" should read --grooves--.

Signed and Sealed this

Sixth Day of September, 1994

Attest:

BRUCE LEHMAN

*Attesting Officer*     *Commissioner of Patents and Trademarks*